United States Patent
Tsai et al.

(10) Patent No.: US 10,649,601 B1
(45) Date of Patent: May 12, 2020

(54) METHOD FOR IMPROVING TOUCH PERFORMANCE OF CAPACITIVE TOUCH SCREEN WITH NON-RECTANGULAR SHAPE

(71) Applicant: HIMAX TECHNOLOGIES LIMITED, Tainan (TW)

(72) Inventors: Cheng-Hung Tsai, Tainan (TW); Yan-Hua Shu, Tainan (TW); Jen-Chieh Lin, Tainan (TW); Wai-Pan Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/172,854

(22) Filed: Oct. 28, 2018

(51) Int. Cl.
  *G06F 3/044* (2006.01)
  *G06F 3/0488* (2013.01)
  *G06F 3/041* (2006.01)

(52) U.S. Cl.
  CPC ............ *G06F 3/044* (2013.01); *G06F 3/0412* (2013.01); *G06F 3/04886* (2013.01)

(58) Field of Classification Search
  CPC ........ G06F 3/0418; G06F 3/042; G06F 3/043; G06F 3/044; G06F 3/045
  See application file for complete search history.

(56) References Cited

U.S. PATENT DOCUMENTS

| | | | |
|---|---|---|---|
| 9,910,544 B1 * | 3/2018 | Yarosh | G06F 3/0418 |
| 2010/0073319 A1 | 3/2010 | Lyon et al. | |
| 2016/0291737 A1 * | 10/2016 | Hirakawa | G06F 3/044 |
| 2017/0017347 A1 * | 1/2017 | Wilson | G06F 3/044 |

FOREIGN PATENT DOCUMENTS

| | | |
|---|---|---|
| CN | 107831937 A | 3/2018 |
| CN | 107894862 A | 4/2018 |
| CN | 108008855 A | 5/2018 |
| CN | 108646945 A | 10/2018 |

* cited by examiner

*Primary Examiner* — Nelson M Rosario
(74) *Attorney, Agent, or Firm* — CKC & Partners Co., LLC

(57) ABSTRACT

A method for improving touch performance of a capacitive touch screen with a non-rectangular shape is provided. The capacitive touch screen includes plural complete cells and at least one incomplete cell for sensing. The method includes: determining whether an active area of the incomplete cell is different from an active area of each of the complete cells; and performing a mutual capacitance compensation on the incomplete cell to compensate a mutual capacitance of the incomplete cell when the active area of the incomplete cell is different from the active area of each of the complete cells.

9 Claims, 5 Drawing Sheets

METHOD FOR IMPROVING TOUCH PERFORMANCE OF CAPACITIVE TOUCH SCREEN WITH NON-RECTANGULAR SHAPE

BACKGROUND

Field of Invention

The present invention relates to a method for improving touch performance. More particularly, the present invention relates to a method for improving touch performance of a capacitive touch screen with a non-rectangular shape.

Description of Related Art

In the existing capacitive touch applications, the touch sensing methods include a self-capacitive sensing method and a mutual-capacitive sensing method. In the case of multi-finger touch applications, the mutual-capacitive sensing method can effectively improve the ghost point defect of the self-capacitive sensing method. Therefore, according to different touch environments and applications, a hybrid sensing method combining the self-capacitive sensing method and the mutual-capacitive sensing method is used to achieve the better touch performance.

It is an important topic to have excellent mutual capacitance sensing capability in more and more complex touch applications. Many driving methods have been developed to improve the signal noise ratio (SNR) of touch performance, such as a multi-tone mutual mode sensing topology. In order to realize this special multi-tone sensing driving method, the design and optimization of the touch pattern becomes an important key factor.

Many modern portable products (e.g., the wearable smartwatch, the headphone, the smart-phone), game sensors (Joysticks), industrial and medical products require more stylish and beautiful appearance. At this time, the touch screen is no longer a complete rectangle shape, but a stylish round, curved and notch shape design. The above shape design may cause the touch screen to have incomplete cell and affect the touch performance. Therefore, the touch performance of the multi-tone drive of the touch screen with non-rectangular shape will be limited and not has better SNR.

SUMMARY

The present invention provides a method for improving touch performance of a capacitive touch screen with a non-rectangular shape. The capacitive touch screen includes plural complete cells and at least one incomplete cell for sensing. The method includes: determining whether an active area of the incomplete cell is different from an active area of each of the complete cells; and performing a mutual capacitance compensation on the incomplete cell to compensate a mutual capacitance of the incomplete cell when the active area of the incomplete cell is different from the active area of each of the complete cells.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
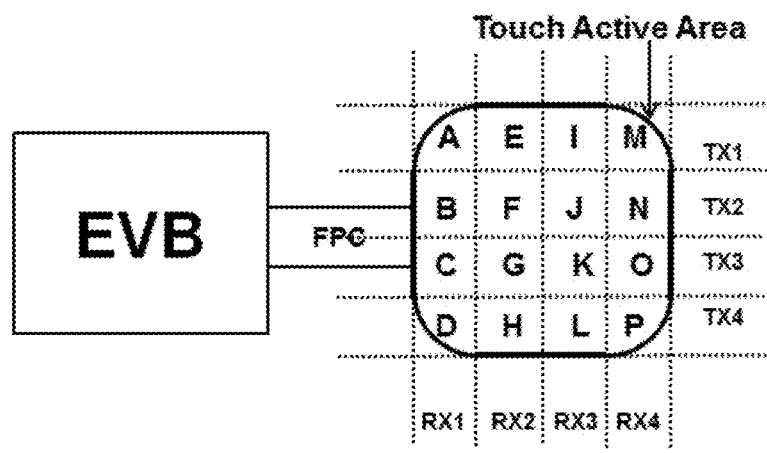
FIG. 1 is an example of a capacitive touch screen with a non-rectangular shape.
Figure 2:
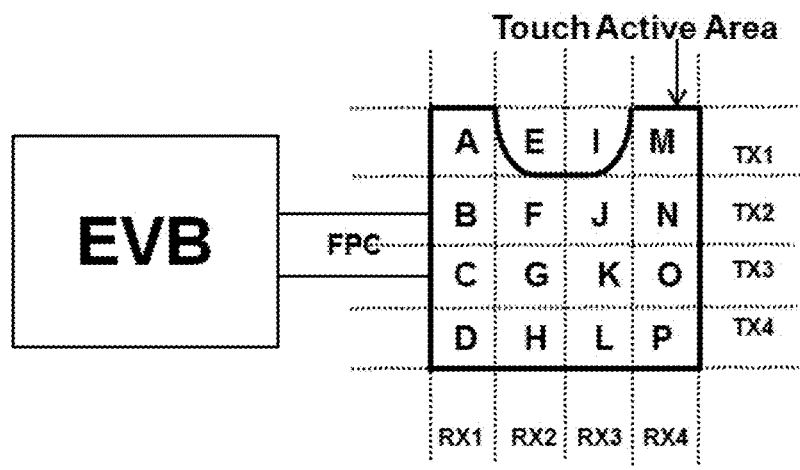
FIG. 2 is another example of a capacitive touch screen with the non-rectangular shape.

FIG. 1 is an example of a capacitive touch screen 10 with a non-rectangular shape (i.e., a corner shape). As shown in FIG. 1, the capacitive touch screen 10 includes plural complete cells (i.e., cells B/C/E/F/G/H/I/J/K/L/N/O of FIG. 1) and four incomplete cells (i.e., cells A/D/M/P of FIG. 1) for sensing. As shown in FIG. 1, the capacitive touch screen 10 includes plural receiver (RX) electrodes (i.e., RX1~RX4) and plural transmit (TX) electrodes (i.e., TX1~TX4). An intersection of one of the RX electrodes and one of the TX electrodes corresponds to one of the complete cells or the incomplete cell. For example, the intersection of RX electrode RX1 and TX electrode TX1 corresponds to the incomplete cell A. For example, the intersection of RX electrode RX2 and TX electrode TX2 corresponds to the complete cell F. FIG. 2 is another example of a capacitive touch screen 20 with the non-rectangular shape (i.e., a notch shape). As shown in FIG. 2, the capacitive touch screen 20 includes plural complete cells (i.e., cells A/B/C/D/F/G/H/J/K/L/M/N/O/P of FIG. 2) and two incomplete cells (i.e., cells E/I of FIG. 2) for sensing.

As discussed above, both of the capacitive touch screens 10 and 20 include the incomplete cells, and thus the mutual capacitance of the incomplete cells of the capacitive touch screen may be insufficient, and thereby causing abnormal multi-tone touch functionality when the incomplete cells are touched. The present invention provides a method for improving touch performance of the capacitive touch screen with non-rectangular shape, e.g., the capacitive touch screens 10 and 20.

Figure 3:
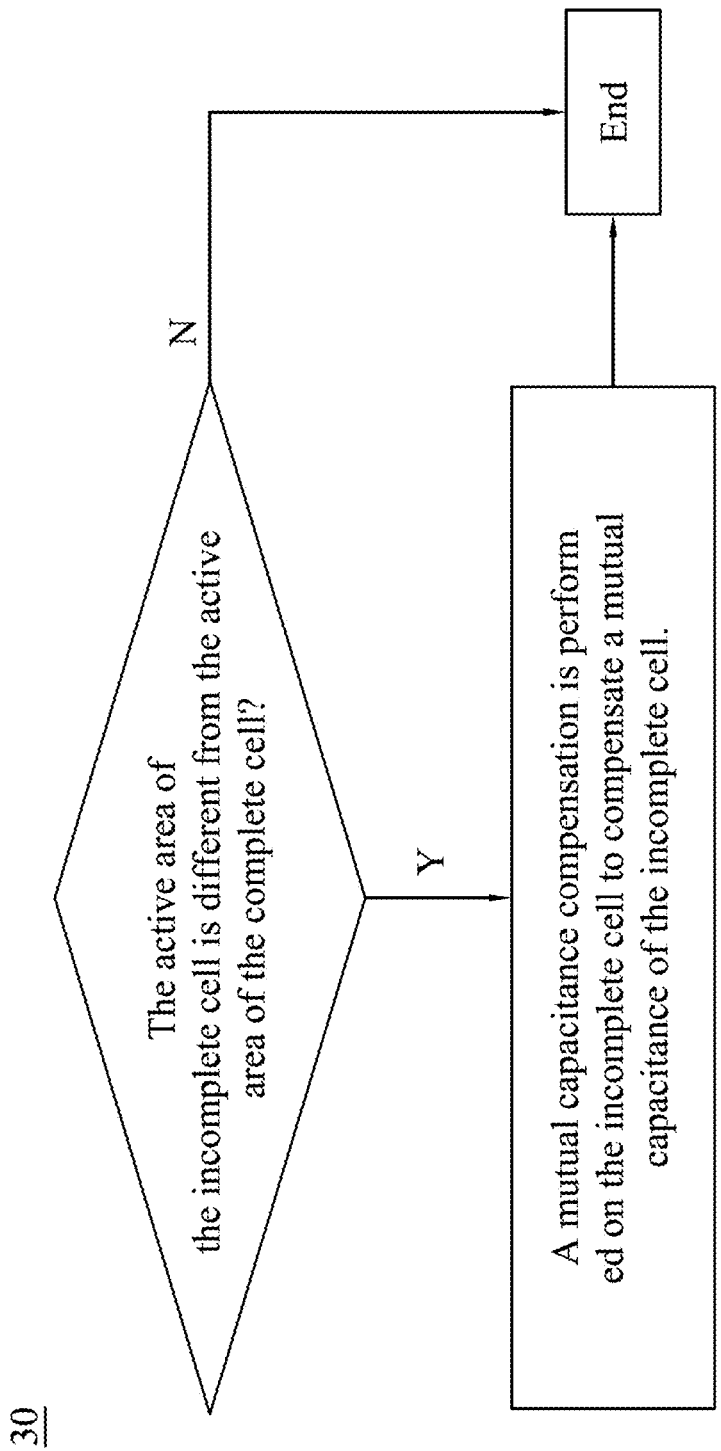
FIG. 3 is a flow chart of a method for improving touch performance of the capacitive touch screen with non-rectangular shape according to the embodiment of the present invention.

FIG. 3 is a flow chart of a method 30 for improving touch performance of the capacitive touch screen with non-rectangular shape according to the embodiment of the present invention. The method 30 includes the following steps: determining whether an active area of the incomplete cell is different from an active area of each of the complete cells; and performing a mutual capacitance compensation on the incomplete cell to compensate a mutual capacitance of the incomplete cell when the active area of the incomplete cell is different from the active area of each of the complete cells.

For example, as shown in FIG. 1, the active area of one of the incomplete cells (i.e., cells A/D/M/P of FIG. 1) of the capacitive touch screen 10 is different from the active area of one of the complete cells (i.e., cells B/C/E/F/G/H/I/J/K/L/N/O of FIG. 1) of the capacitive touch screen 10. For another example, as shown in FIG. 2, the active area of one of the incomplete cells (i.e., cells E/I of FIG. 2) of the capacitive touch screen 20 is different from the active area of one of the complete cells (i.e., cells A/B/C/D/F/G/H/J/K/L/M/N/O/P of FIG. 2) of the capacitive touch screen 20. In addition, in another embodiment of the present invention, the mutual capacitance compensation is performed only when the active area of the incomplete cell is smaller than or equal to a half of the active area of each of the complete cells.

Figure 4:
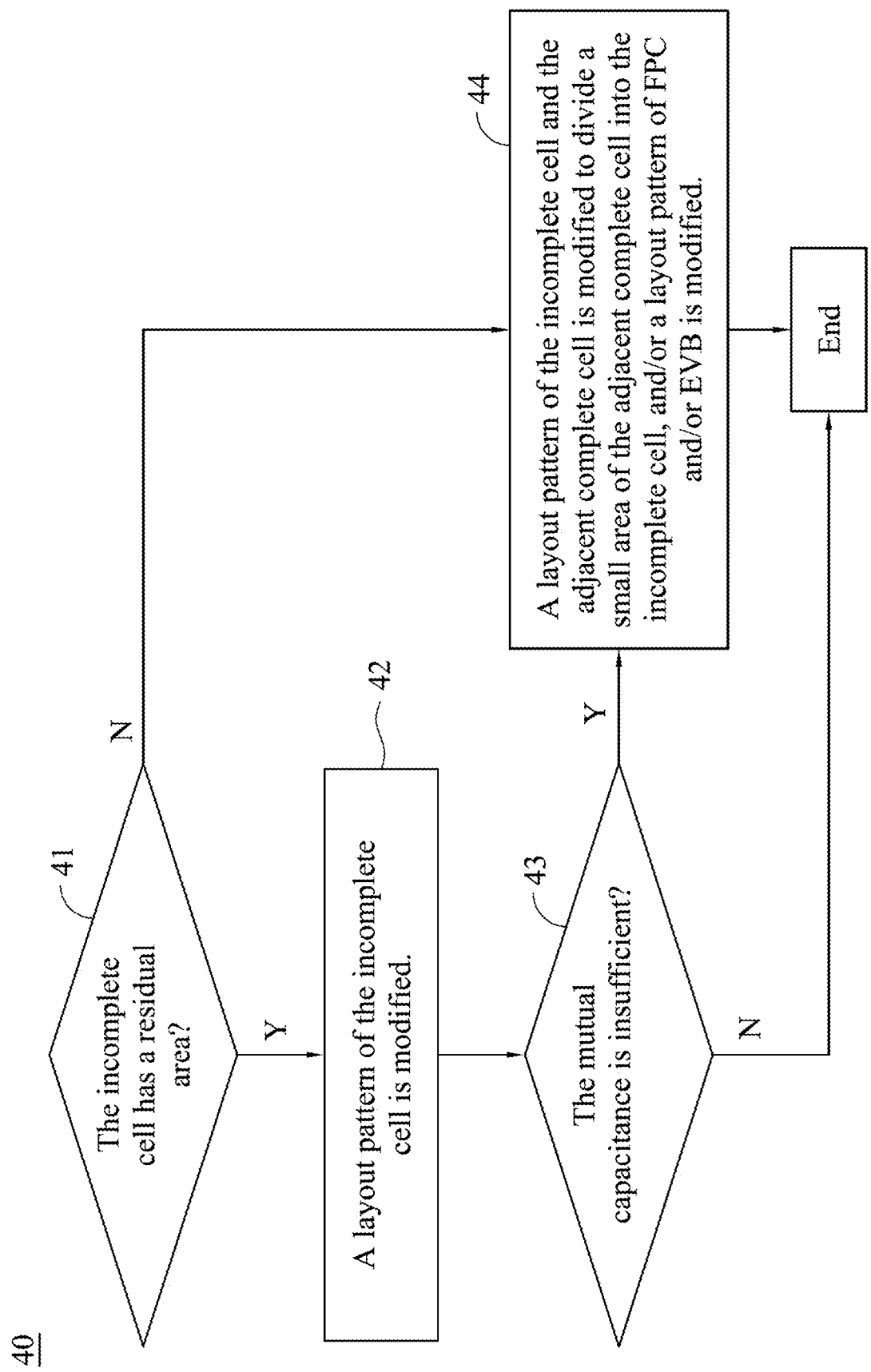
FIG. 4 is a flow chart of a method for performing the mutual capacitance compensation according to the embodiment of the present invention.

FIG. 4 is a flow chart of a method 40 for performing the mutual capacitance compensation according to the embodiment of the present invention. The method 40 includes plural steps 41-44. In step 41, determining whether the incomplete cell has a residual area. When the incomplete cell has the residual area, a layout pattern of the incomplete cell is modified to compensate the mutual capacitance of the incomplete cell, as shown in step 42 of FIG. 4.

Figure 5:
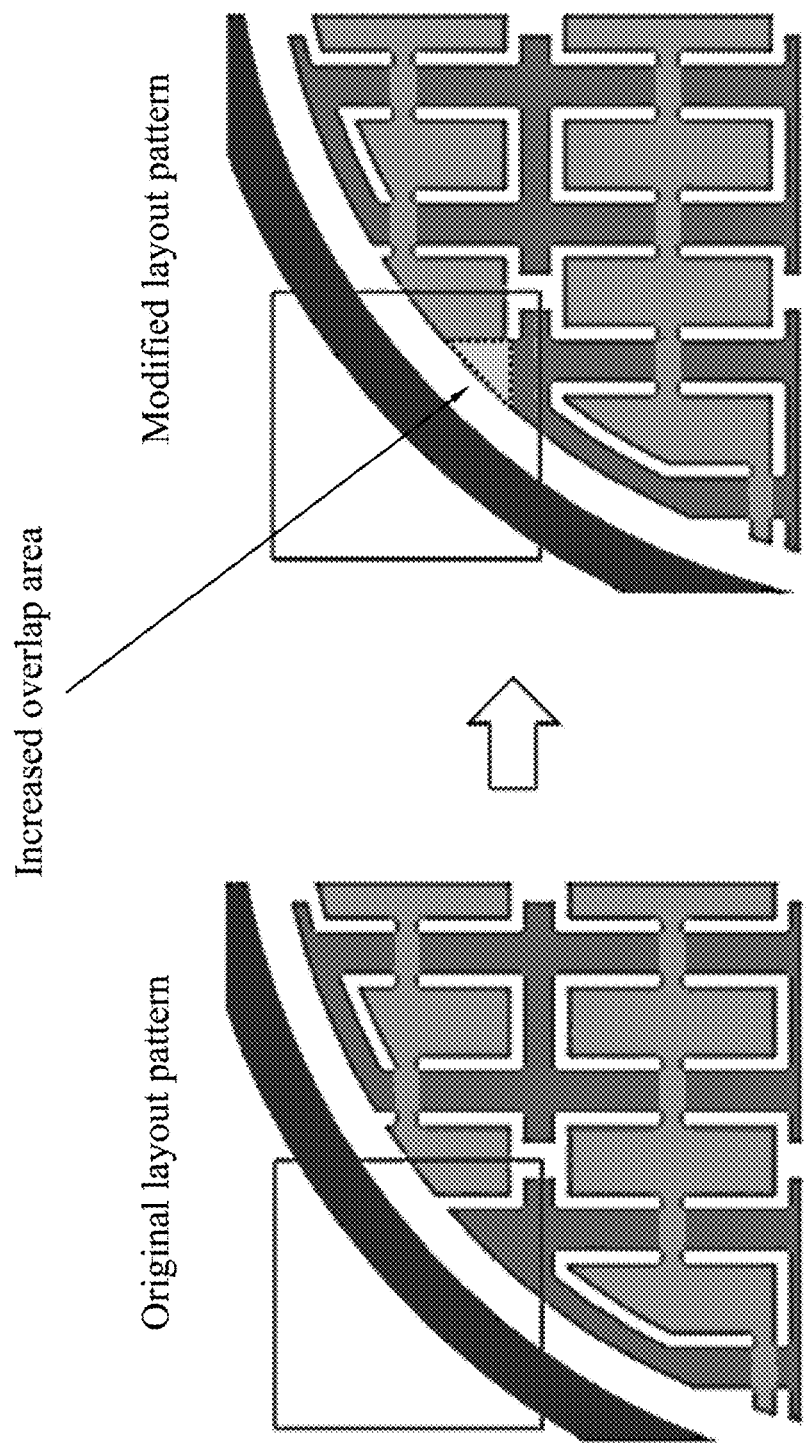
FIG. 5 shows the exemplary modification of the layout pattern of capacitive touch screen with the corner shape according to the embodiment of the present invention.

FIG. 5 shows the exemplary modification of the layout pattern of capacitive touch screen with the corner shape according to the embodiment of the present invention. As shown in a dotted box of FIG. 5, an overlap area of the corresponding RX electrode and the corresponding TX electrode of the incomplete cell is increased, thereby compensating the mutual capacitance of the incomplete cell.

In addition, the mutual capacitance of the incomplete cell having the residual area may also be compensated by adjusting a layout pattern of a co-plane differential coupling trace of the incomplete cell so as to compensate the mutual capacitance of the incomplete cell. The layout pattern of the co-plane differential coupling trace of the incomplete cell is adjusted by increasing a width of the co-plane differential coupling trace or decreasing a spacing of the co-plane differential coupling trace or increasing a length of the co-plane differential coupling trace.

Referring to FIG. 4, after the step 42 is performed, determining whether the mutual capacitance of the incomplete cell is insufficient, as shown in step 43 of FIG. 4. When the mutual capacitance of the incomplete cell is insufficient or the incomplete cell has no residual area, a layout pattern of the incomplete cell and the adjacent complete cell is modified to divide a small area of the adjacent complete cell into the incomplete cell, and/or a layout pattern of FPC and/or EVB is modified, as shown in step 44 of FIG. 4, so as to compensate the mutual capacitance of the incomplete cell.

Figure 6:
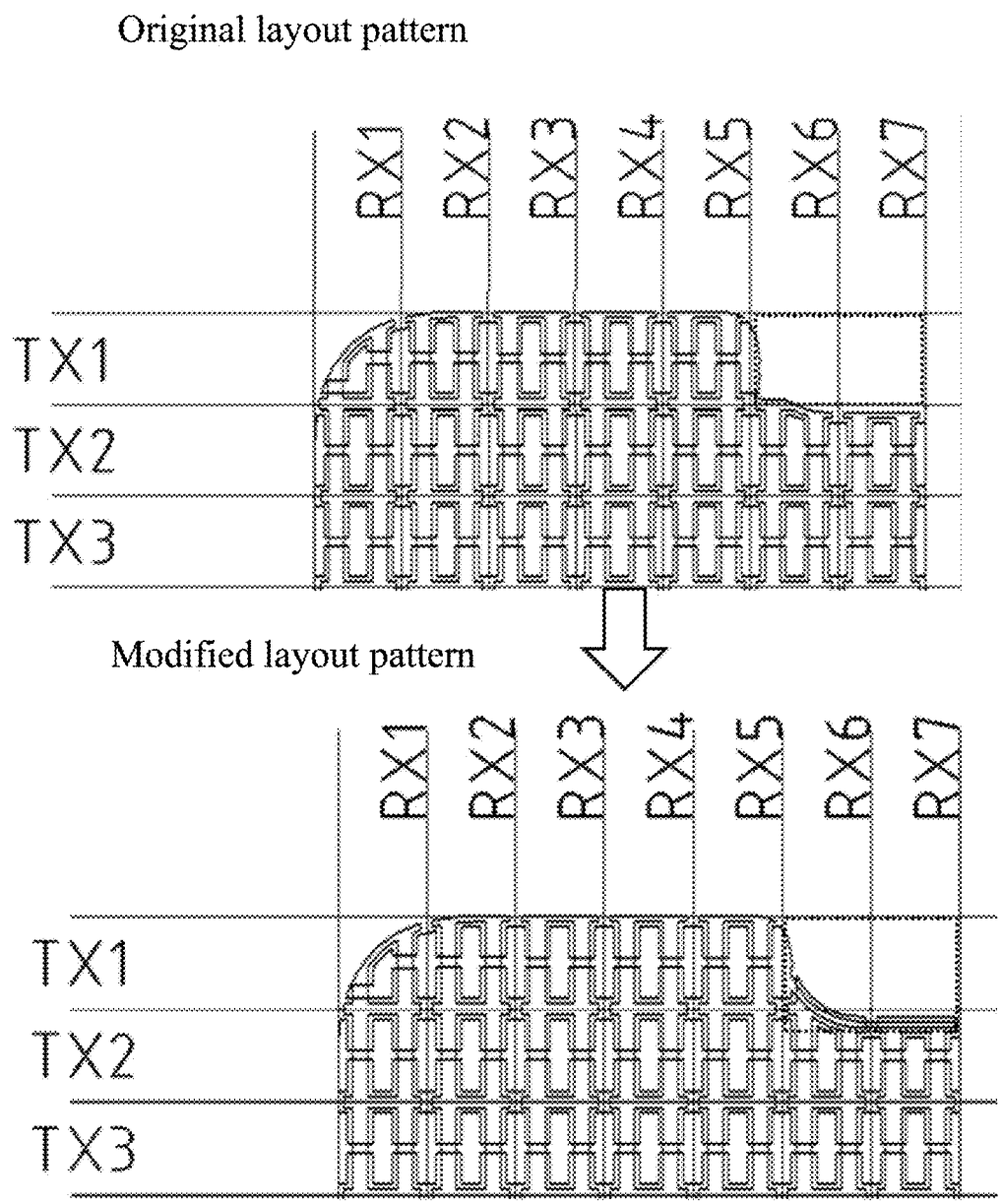
FIG. 6 shows the exemplary modification of the layout pattern of capacitive touch screen with the notch shape according to the embodiment of the present invention.

FIG. 6 shows the exemplary modification of the layout pattern of capacitive touch screen with the notch shape according to the embodiment of the present invention. As shown in a dotted box of FIG. 6, a layout pattern of the incomplete cells (i.e., cells located between TX1 and RX6/RX7) and the adjacent complete cells (i.e., cell located between TX1 and RX5 and cells located between TX2 and RX6/RX7) is modified to divide a small area of the adjacent complete cell into the incomplete cell. It is noted that, for the adjacent cells, the compensated area divided into the incomplete cell is a dead zone, so the compensated area cannot be too big.

Referring to FIG. 4, in step 44, a layout pattern of a flexible printed circuit (FPC) of the capacitive touch screen connected to the complete cells and the incomplete cell may be modified to compensate the mutual capacitance of the incomplete cell. The layout pattern of the FPC is modified by increasing an overlap area of at least two traces of the FPC which are connected to the incomplete cell to compensate the mutual capacitance of the incomplete cell.

Referring to FIG. 4, in step 44, a layout pattern of an evaluation board (EVB) of the capacitive touch screen connected to the complete cells and the incomplete cell may be modified to compensate the mutual capacitance of the incomplete cell. The layout pattern of the EVB is modified by increasing an overlap area of at least two traces of the EVB which are connected to the incomplete cell to compensate the mutual capacitance of the incomplete cell.

From the above description, the present invention provides a method for improving touch performance of the capacitive touch screen with the non-rectangular shape by compensating the mutual capacitance of the incomplete cell. Therefore, the touch performance of the multi-tone drive of the touch screen with non-rectangular shape is improved and has better SNR in some special applications (e.g., glove touching, low dielectric constant of sensor cover layer, thick sensor cover layer).

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for improving touch performance of a capacitive touch screen with a non-rectangular shape, wherein the capacitive touch screen comprises a plurality of complete cells and at least one incomplete cell for sensing, the method comprising:
   determining whether an active area of the incomplete cell is different from an active area of each of the complete cells; and
   performing a mutual capacitance compensation on the incomplete cell to compensate a mutual capacitance of the incomplete cell when the active area of the incomplete cell is different from the active area of each of the complete cells;
   wherein the capacitive touch screen comprises a plurality of receiver (RX) electrodes and a plurality of transmit (TX) electrodes; wherein an intersection of one of the RX electrodes and one of the TX electrodes corresponds to one of the complete cells or the incomplete cell; wherein performing the mutual capacitance compensation comprises:
   determining whether the incomplete cell has a residual area; and
   modifying a layout pattern of the incomplete cell of the capacitive touch screen to compensate the mutual capacitance of the incomplete cell when the incomplete cell has the residual area.

2. The method of claim 1, wherein the mutual capacitance compensation is performed only when the active area of the incomplete cell is smaller than or equal to a half of the active area of each of the complete cells.

3. The method of claim 1, wherein modifying the layout pattern of the incomplete cell comprises:

adjusting a layout pattern of a co-plane differential coupling trace of the incomplete cell by increasing a width of the co-plane differential coupling trace or decreasing a spacing of the co-plane differential coupling trace or increasing a length of the co-plane differential coupling trace.

4. The method of claim 1, wherein performing the mutual capacitance compensation further comprises:

modifying a layout pattern of the incomplete cell and at least one adjacent complete cell adjacent to the incomplete cell by dividing a small area of the adjacent complete cell into the incomplete cell.

5. The method of claim 1, wherein performing the mutual capacitance compensation further comprises:

modifying a layout pattern of a flexible printed circuit (FPC) of the capacitive touch screen connected to the complete cells and the incomplete cell.

6. The method of claim 5, wherein modifying the layout pattern of the FPC comprises:

increasing an overlap area of at least two traces of the FPC which are connected to the incomplete cell to compensate the mutual capacitance of the incomplete cell.

7. The method of claim 1, wherein modifying the layout pattern of the incomplete cell comprises:

increasing an overlap area of the corresponding RX electrode and the corresponding TX electrode of the incomplete cell.

8. The method of claim 1, wherein performing the mutual capacitance compensation further comprises:

modifying a layout pattern of an evaluation board (EVB) of the capacitive touch screen connected to the complete cells and the incomplete cell.

9. The method of claim 8, wherein modifying the layout pattern of the EVB comprises:

increasing an overlap area of at least two traces of the EVB which are connected to the incomplete cell to compensate the mutual capacitance of the incomplete cell.

* * * * *